(No Model.)

W. P. SNEPP.
GANG CULTIVATOR.

No. 436,957. Patented Sept. 23, 1890.

Witnesses:
James R. Sharp
Adam Mutz

Inventor:
W. P. Snepp

UNITED STATES PATENT OFFICE.

WALTER P. SNEPP, OF GERMAN, BARTHOLOMEW COUNTY, INDIANA.

GANG-CULTIVATOR.

SPECIFICATION forming part of Letters Patent No. 436,957, dated September 23, 1890.

Application filed February 21, 1890. Serial No. 341,372. (No model.)

*To all whom it may concern:*

Be it known that I, WALTER P. SNEPP, a citizen of the United States, residing in German township, county of Bartholomew, and State of Indiana, have invented certain new and useful Improvements in Gang-Cultivators; and I hereby declare that the following is a full, clear, and exact description of the invention, which will enable others skilled in the art to which it appertains to make and use the same.

My improvement relates to gang-cultivators in which spring-jaws are used in connection with the beam and shank of the gang in the manner and for the purpose hereinafter set forth; and the object of my improvement is to provide for the tripping of the shovel in coming in contact with roots and other obstructions. I attain this object by the mechanism illustrated in the following drawings.

Figure 1:
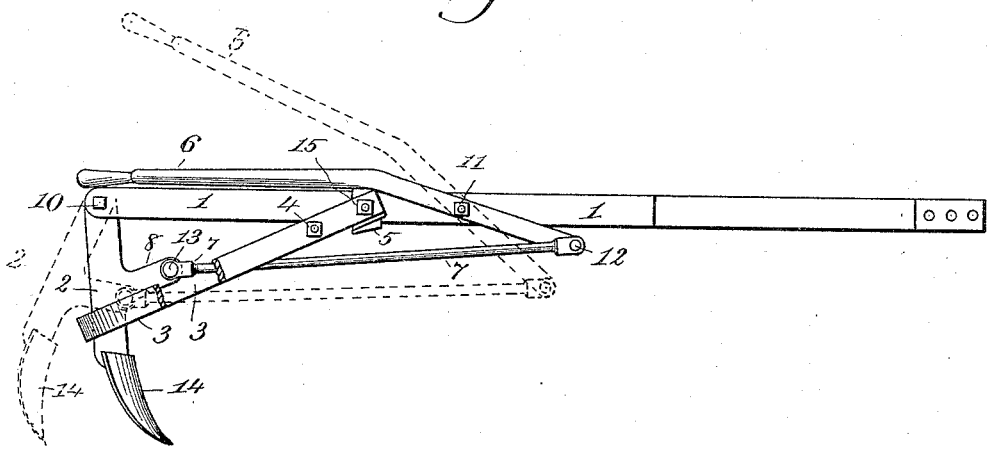
Figure 2:
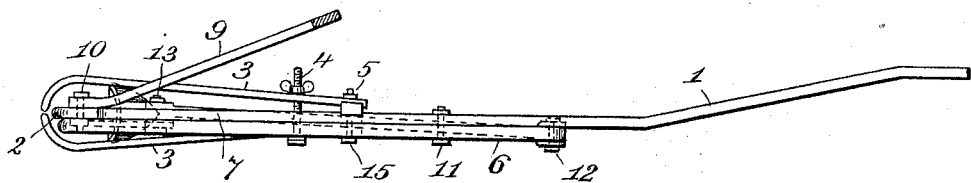

Figure 1 is a side and Fig. 2 a top view of the right gang of the cultivator.

Similar figures refer to similar parts throughout both the views.

The beam 1 is shaped to suit its position in the combination, and to which the angular lever 6, the spring-jaws 3 3, and the shank 2, in connection with the connecting-bar 9, are attached by their respective bolts 11, 5, and 10. The rear end of the beam 1 is provided with an offset to allow the shank 2 to stand immediately behind and on a line with the center thereof. The guide 8 is a curved projection of the shank 2, and is connected with the lever 6 by the bar 7 and bolts 13 and 12. The spring-jaws are firmly fixed to the sides of the beam 1 by the grooved plates 15 15 and bolt 5, and diverge toward the rear in a diagonal position, and curving meet each other immediately behind the shank 2 and guide 8. The rear of the shank 2 is oval-shaped at the point of contact with the jaws, the ends of which are slightly beveled for the purpose of giving direction to the shank in passing between them, which jaws are pressed together and regulated by the adjusting-bolt 4 for the purpose of holding the shank in position until forced back by the shovel 14 coming in contact with unyielding obstructions. The bar 9 extended connects with the adjoining gang in the combination.

When in use, the shovel 14, in striking an unyielding obstacle, forces the shank 2 backward between the jaws 3 3 to the required angle and passes over the obstruction, the guide 8 remaining between the jaws. The shank 2, with its shovel 14, is replaced by forcing the handle of the lever 6 downward from its elevated position.

My improvement may be used on any of the cultivators now in use, as well as grain-drills, with a few modifications to suit the different constructions.

Having fully described my invention, what I claim, and desire to secure by Letters Patent, is—

In a gang-cultivator, the shank 2, hinged to the rear end of the beam 1 and provided with a guide 8, the jaws 3, the connecting-rod 7, and lever 6, all substantially as set forth.

W. P. SNEPP.

Witnesses:
ADAM MUTZ,
JAMES WARD.